United States Patent
Neild et al.

(10) Patent No.: US 10,637,847 B2
(45) Date of Patent: Apr. 28, 2020

(54) COLLECTION OF SENSOR DATA FROM SENSOR DEVICES

(71) Applicant: BRITISH TELECOMMUNICATIONS PUBLIC LIMITED COMPANY, London (GB)

(72) Inventors: Ian Neild, London (GB); Mohammad Zoualfaghari, London (GB); Tim Stevens, London (GB); Richard Gedge, London (GB); Paul Putland, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 16/337,479

(22) PCT Filed: Sep. 19, 2017

(86) PCT No.: PCT/EP2017/073636
§ 371 (c)(1),
(2) Date: Mar. 28, 2019

(87) PCT Pub. No.: WO2018/060010
PCT Pub. Date: Apr. 5, 2018

(65) Prior Publication Data
US 2019/0230075 A1 Jul. 25, 2019

(30) Foreign Application Priority Data

Sep. 29, 2016 (EP) ..................................... 16191350
Sep. 29, 2016 (GB) .................................. 1616516.9

(51) Int. Cl.
*H04L 29/06* (2006.01)
*H04W 84/18* (2009.01)
(Continued)

(52) U.S. Cl.
CPC .......... *H04L 63/0815* (2013.01); *H04L 63/02* (2013.01); *H04L 63/0209* (2013.01);
(Continued)

(58) Field of Classification Search
None
See application file for complete search history.

(56) References Cited

U.S. PATENT DOCUMENTS

2003/0115344 A1 6/2003 Tang et al.
2004/0249930 A1* 12/2004 Mousavi ................. H04L 29/06
709/224
(Continued)

FOREIGN PATENT DOCUMENTS

CN 101330714 12/2008
CN 101919278 A 12/2010
(Continued)

OTHER PUBLICATIONS

International Search Report for PCT/EP2017/073636, dated Jan. 5, 2018, 5 pages.
(Continued)

*Primary Examiner* — Henry Tsang
(74) *Attorney, Agent, or Firm* — Nixon & Vanderhye PC

(57) ABSTRACT

Methods and systems are disclosed for enabling sensor data to be collected from sensor devices (1), the sensor devices being configured to sense a condition and to send sensor messages according to a wireless communication protocol to a wireless access point (6) of a local network (10), the sensor messages comprising sensor data indicative of said condition, said sensor messages also comprising a destination indication indicative of a predetermined network location outside the local network (10).

15 Claims, 4 Drawing Sheets

Access route flowcharts

(51) Int. Cl.
  *H04L 29/08* (2006.01)
  *H04W 4/38* (2018.01)
(52) U.S. Cl.
  CPC .......... *H04L 63/0227* (2013.01); *H04L 67/12* (2013.01); *H04W 4/38* (2018.02); *H04W 84/18* (2013.01)

(56) References Cited

U.S. PATENT DOCUMENTS

| | | | |
|---|---|---|---|
| 2006/0039316 A1 | 2/2006 | Ogushi | |
| 2006/0122944 A1* | 6/2006 | Ryan | G06Q 10/08 705/67 |
| 2009/0172798 A1 | 7/2009 | Upp | |
| 2010/0146614 A1 | 6/2010 | Savoor | |
| 2013/0003720 A1* | 1/2013 | Tasker | H04L 65/1069 370/352 |
| 2013/0031615 A1* | 1/2013 | Woodward | H04W 8/02 726/4 |
| 2015/0067832 A1 | 3/2015 | Sastry | |
| 2015/0249642 A1 | 9/2015 | Burns et al. | |
| 2016/0191524 A1* | 6/2016 | Bathija | H04L 63/0892 726/3 |
| 2016/0226917 A1 | 8/2016 | Plagemann et al. | |
| 2016/0255420 A1* | 9/2016 | McCleland | H04W 4/70 340/870.07 |
| 2017/0286497 A1* | 10/2017 | Crabtree | H04L 67/12 |

FOREIGN PATENT DOCUMENTS

| | | |
|---|---|---|
| CN | 103249043 A | 8/2013 |
| CN | 105120526 A | 12/2015 |
| CN | 105208560 A | 12/2015 |
| GB | 2520160 | 5/2015 |
| WO | 99/16272 | 4/1999 |
| WO | 2014/116152 | 7/2014 |
| WO | 2015/079195 | 6/2015 |

OTHER PUBLICATIONS

Written Opinion of the ISA for PCT/EP2017/073636, dated Jan. 5, 2018, 7 pages.
Thornycroft, "Wi-Fi access for the Internet of Things can be complicated", Network World, dated Mar. 21, 2016, http://www.networkworld.com/article/3046132/internet-of-things/wi-fi-access-for-the-internet-of-things-can-be-completed.htm 7 pages.
Extended European Search Report issued in Application No. EP16191350, dated Apr. 7, 2017, 8 pages.
GB Search and Examination Report issued in Application No. GB1616516.9 dated Mar. 1, 2017, 8 pages.
Office Action dated Nov. 6, 2019 issued in Chinese Application No. 201780066807.7 (3 pgs.) and translation (4 pgs.).
Search Report dated Oct. 28, 2019 issued in Chinese Application No. 201780066807.7 (2 pgs.) and Translation (2 pgs.).

* cited by examiner

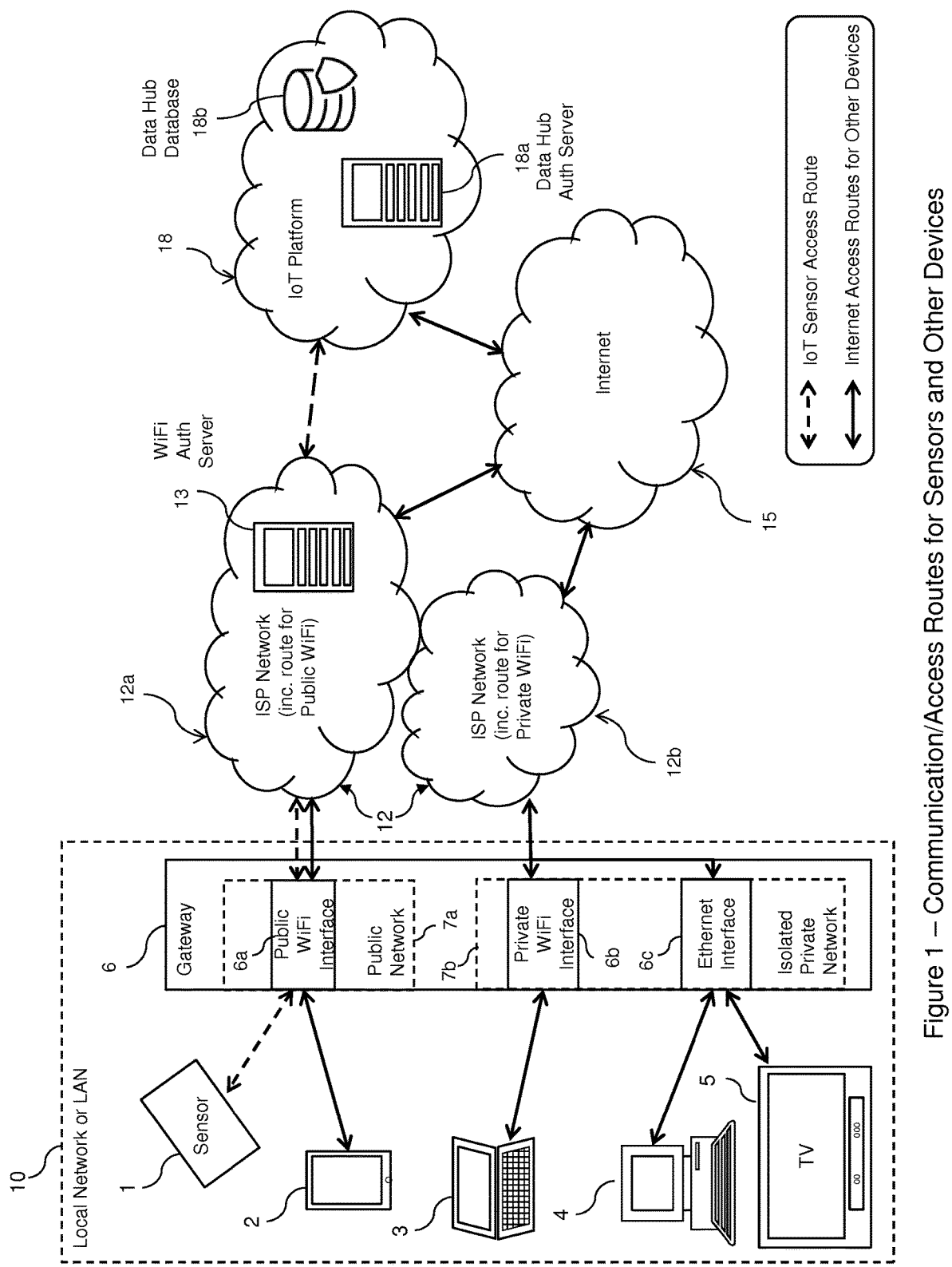
Figure 1 – Communication/Access Routes for Sensors and Other Devices

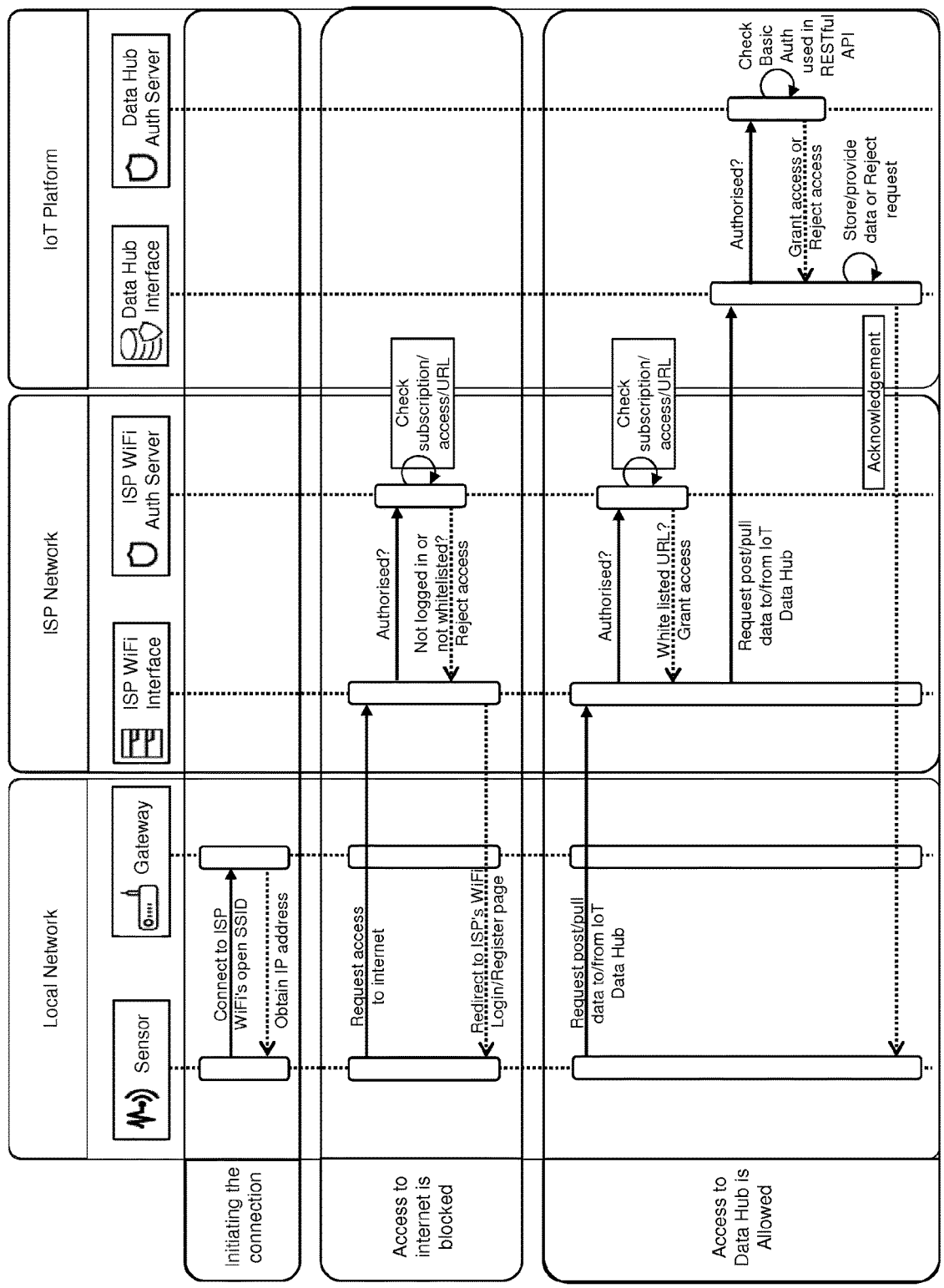
Figure 2 – Sensor Message Flow Diagram

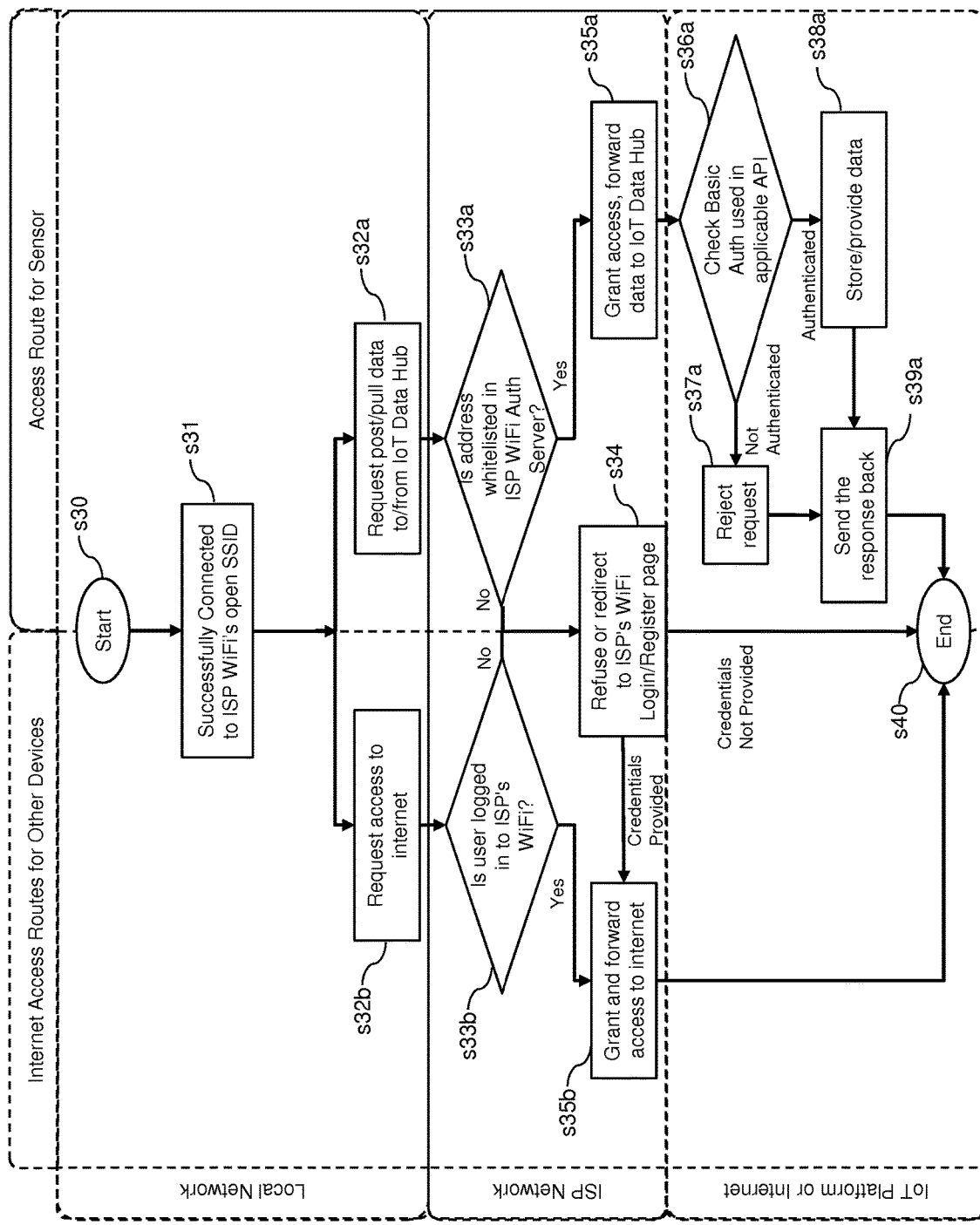
Figure 3 – Access route flowcharts

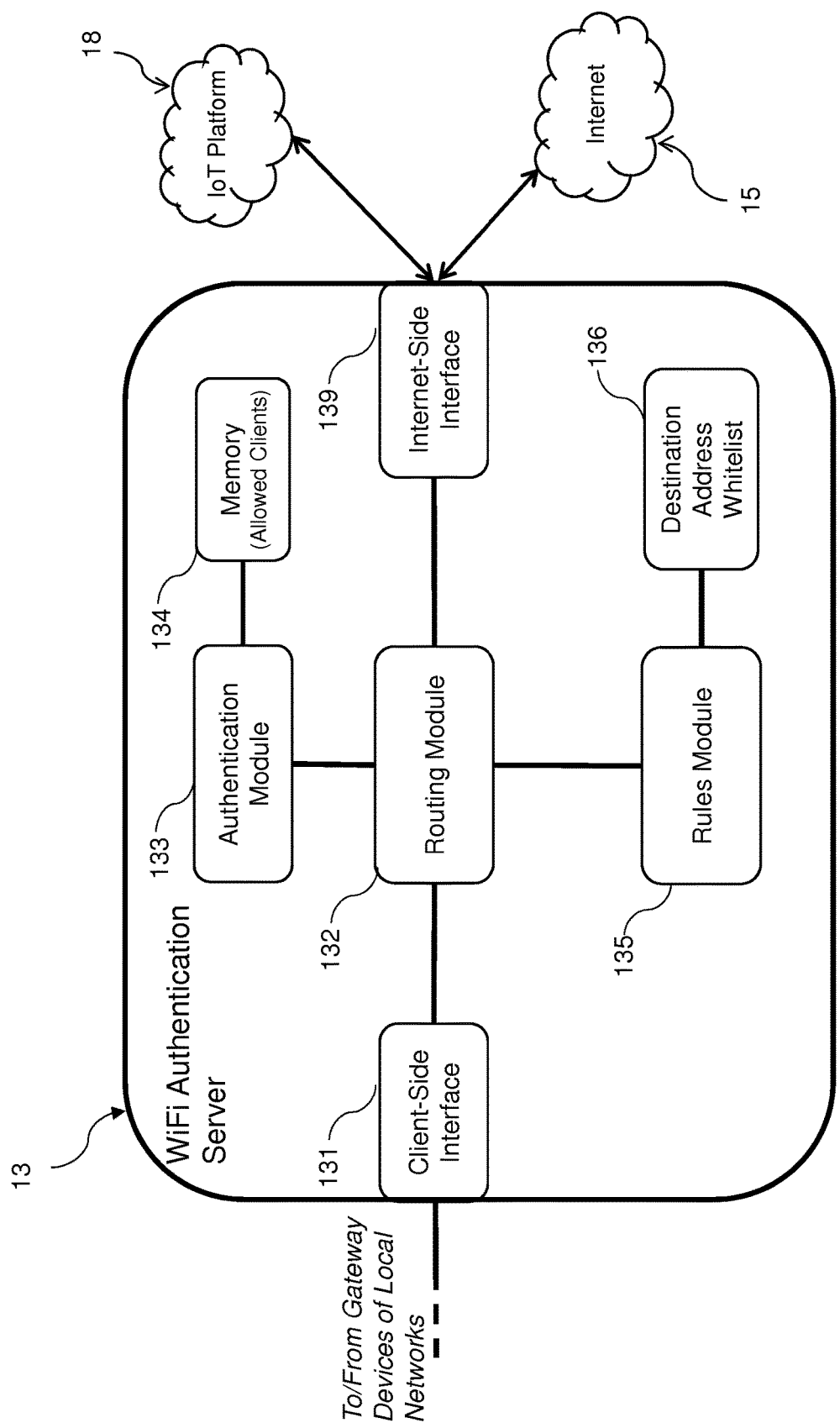
Figure 4 - WiFi Authentication Server

COLLECTION OF SENSOR DATA FROM SENSOR DEVICES

This application is the U.S. national phase of International Application No. PCT/EP2017/073636 filed 19 Sep. 2017, which designated the U.S. and claims priority to GB Patent Application No. 1616516.9 filed 29 Sep. 2016, and EP Patent Application No. 16191350.4 filed 29 Sep. 2016, the entire contents of each of which are hereby incorporated by reference.

TECHNICAL FIELD

The present invention relates to methods and systems for enabling sensor data to be collected from sensor devices. In particular, preferred embodiments of the invention relate to methods and systems for enabling sensor data to be collected from wireless-capable sensor devices configured to sense a condition and to send sensor messages according to a wireless communication protocol to a wireless access point of a local network for onward transmission to a destination outside the local network.

BACKGROUND TO THE INVENTION AND PRIOR ART

The "Internet of Things" (IoT) is predicted to include in the region of 20 billion devices by 2020, many of which will connect to the Internet or other networks wirelessly, via WiFi (or possibly via other wireless communication protocols).

Current issues of relevance include (i) that WiFi access points typically need to have (or benefit from having) security enabled; (ii) that access generally involves human interaction and/or pre-configuration keys/services; (iii) that registration is generally required of IoT "things" (i.e. sensors or other devices) to services; and (iv) that different services may require different data from different WiFi-connected "things".

There are various different ways in which devices such as IoT sensors and other wireless devices may be connected to the Internet or other networks wirelessly. These generally involve access via a wireless-enabled gateway device which is connected to an Internet Service Provider's (ISP's) network configured to handle data received from (or data destined for) a wireless device. Accessing the Internet from a wireless device via an ISP's WiFi network may involve (i) enabling WiFi connectivity on the device and selecting the ISP's WiFi network from a list of available WiFi networks; (ii) entering a username and/or password on the device; and/or (particularly for mobile phones or "tablet" devices) possibly (iii) using an ISP's "WiFi App", which may hold usernames and/or passwords, thus removing the need for users to enter them each time.

Most WiFi connections require authentication information (such as username and password and/or a key or code) to be entered, or a bespoke application needs to be used that passes on authentication details. Successful authentication generally then allows full internet access. Authentication may be managed at a WiFi Access Point (AP), the Access Point itself possibly being authenticated at an Authentication, Authorization & Accounting (AAA) server (also referred to as "Intelligent Services Gateways"), for example.

Fully open WiFi Access Points (i.e. those without authentication functionality) pose a security risk and are typically restricted to semi-public areas (e.g. hotels, shops). Even they generally have some authentication of the actual Access Points themselves: this may be at an AAA server, or at a Broadband Remote Access Server (B-RAS) where the desired authentication involves determining whether an associated broadband line is entitled to network services, or may involve an Access Control List (ACL) and/or routing entry in the case of wholly-IP networks, for example.

For users requiring or desiring WiFi access from a device such as a wireless-enabled mobile phone or "Smart-Phone", authentication details are usually entered by users on a keypad or screen of the device concerned, but in some cases may rely on (a) authentication details being pre-loaded onto devices at the time of manufacture or later, or entered by means of another form of configuration process; b) activation of a key button on the WiFi device and/or the WiFi base station (using a "Wi-Fi Protected Access" protocol such as "WPA" or "WPA2", for example); c) authentication using software (or an "App") which checks credentials with a back-end server (if the WiFi is open (e.g. BT WiFi), this may need to be refreshed every few minutes, and needs an account); or d) a physical peripheral interface between a Machine-to-Machine (M2M) module and a portable device, for example.

Without pre-configured or automatic authentication", a user using WiFi devices may be presented with a login page and/or be blocked from internet access.

For systems involving thousands or even millions of sensors, it may not be feasible to have easy access to the sensors (e.g. sensors on lamp posts in the context of "smart-cities" technologies, for example), and it would generally be time-consuming and expensive to set and/or change connection details for each of a multitude of such sensors. Moreover, it may not be feasible to have an account for each sensor.

Prior Art

International application WO2015/079195 describes how a home router may send a message over a public cloud. It requires authentication details to be used for the login.

An article entitled "Wi-Fi access for the Internet of Things can be complicated" by Peter Thornycroft in "Network World", dated 21 Mar. 2016 and available online at: http://www.networkworld.com/article/3046132/internet-of-things/wi-fi-access-for-the-internet-of-things-can-be-complicated.html discusses difficulties that may be encountered when connecting Internet of Things sensors and devices.

United States patent application US2015249642 ("Burns") relates to providing user-controlled access to APIs of networked devices over a private Wi-Fi network or other private network.

International application WO14/116152 ("Ericsson/Kato") relates to provisioning an access list from a communication apparatus to a relaying apparatus, and in particular to providing access control securely in sensor networks.

United States patent application US2003/115344 ("Tang") relates to access control management techniques using access permission lists to prevent unauthorized access to a network resource.

Chinese patent application CN101330714 ("Huawei") relates to wireless access methods, and in particular to an access control management method which uses access permission lists to prevent unauthorized access.

United States patent application US2006/122944 ("Ryan et al") relates to techniques for enabling communication between an asset tracking device and a reporting server via a third party access point, particularly in relation to scenarios where Radio Frequency Identification (RFID) tags are used to facilitate item tracking.

SUMMARY OF THE INVENTION

According to a first aspect of the invention, there is provided a method of enabling sensor data to be collected from sensor devices, the sensor devices being configured to sense a condition and to send sensor messages according to a wireless communication protocol to a wireless access point of a local network, the sensor messages comprising sensor data indicative of said condition, said sensor messages also comprising a destination indication indicative of a predetermined network location outside the local network, the method comprising:

at a wireless access point configured to forward messages via an external network to a predetermined authentication server, the predetermined authentication server being configured to identify messages which satisfy predetermined authentication criteria:
    receiving sensor messages from one or more sensor devices; and
    forwarding said sensor messages via said external network to said predetermined authentication server;
and at said authentication server:
    inspecting messages received from said wireless access points to determine whether respective messages satisfy said predetermined authentication criteria, and forwarding messages which do satisfy said predetermined authentication criteria on towards the respective network locations indicated by the destination indications comprised in said messages;
characterised in that the method further comprises, at said authentication server:
    inspecting sensor messages received from said wireless access points which do not satisfy said predetermined authentication criteria and determining from respective such sensor messages the destination indications comprised therein;
    comparing the destination indications determined from respective sensor messages which do not satisfy said predetermined authentication criteria with a predetermined list of destination indications;
    in respect of sensor messages which do not satisfy said predetermined authentication criteria and which comprise destination indications included in the predetermined list of destination indications, forwarding said sensor messages to the respective network locations indicated by the destination indications comprised in said sensor messages; and
    in respect of sensor messages which do not satisfy said predetermined authentication criteria and which comprise destination indications not included in the predetermined list of destination indications, not forwarding said sensor messages to the respective network locations indicated by the destination indications comprised in said sensor messages.

According to preferred embodiments, the wireless access point may be configured to make respective identifiers available to devices in the local network indicative of the devices being deemed to be within a private wireless network or within a public wireless network.

According to preferred embodiments, the wireless access point may be configured to inspect data received according to a wireless communication protocol from a device in the local network and identify from said data a wireless network identifier indicative of whether the device from which the data has been received is deemed to be within a private wireless network or within a public wireless network. In such embodiments, the wireless access point may be configured to route data having a wireless network identifier indicative that the device from which the data has been received is deemed to be within a public wireless network to said predetermined authentication server. Alternatively or additionally, the wireless access point may be configured to route data having a wireless network identifier indicative that the device from which the data has been received is deemed to be within a private wireless network towards a destination indicated by a destination indication comprised in said data.

According to preferred embodiments, the wireless access point may also be configured to receive data via a wired connection and to route said data towards a destination indicated by a destination indication comprised in said data.

According to preferred embodiments, a plurality of wireless access points may each be configured to forward messages via an external network to a predetermined authentication server, each wireless access point being configured to receive sensor messages from one or more sensor devices, and to forward the sensor messages via said external network to said predetermined authentication server.

According to preferred embodiments, the authentication server may be configured to inspect authentication credentials in respect of data received from said wireless access points and determine therefrom whether the data has been received from an authenticated device and/or from an authenticated user, and if so, to forward said data towards a network location indicated by a destination indications comprised in said data.

According to preferred embodiments, the authentication server may be configured to inspect authentication credentials in respect of data received from said wireless access points and determine therefrom whether the data has been received from an authenticated device and/or from an authenticated user, and if not, to request authentication credentials in respect of the device and/or the user from which the data has been received.

According to preferred embodiments, the wireless access point may be configured to receive sensor messages sent according to a wireless communication protocol from a plurality of sensor devices.

According to preferred embodiments, the wireless access point may be configured to receive sensor messages from an aggregator device, the aggregator device being configured to receive sensor messages sent according to a wireless communication protocol from one or more sensor devices and forward said sensor messages to the wireless access point.

According to preferred embodiments, the sensor messages said sensor devices are configured to send are sensor messages indicative of one or more of the following: temperature, humidity, pressure, sound, light, movement or other activity, presence/absence, or other physical conditions.

According to a second aspect of the invention, there is provided a system for enabling sensor data to be collected from sensor devices, the sensor devices being configured to sense a condition and to send sensor messages according to a wireless communication protocol to a wireless access point of a local network, the sensor messages comprising sensor data indicative of said condition, said sensor messages also comprising a destination indication indicative of a predetermined network location outside the local network, the system comprising:

one or more wireless access points each configured to receive sensor messages from one or more sensor devices in a local wireless network via a local network interface, and to forward said sensor messages via an external network interface to a predetermined authentication server in an external network, the predetermined authentication server being configured to identify messages which satisfy predetermined authentication criteria; and an authentication server configured to inspect messages received from one or more wireless access points for which it is the predetermined authentication server and to determine whether respective messages satisfy said predetermined authentication criteria, and to forward messages which do satisfy said predetermined authentication criteria on towards the respective network locations indicated by the destination indications comprised in said messages;

characterised in that the authentication server is further configured to inspect sensor messages received from one or more wireless access points for which it is the predetermined authentication server and which do not satisfy said predetermined authentication criteria and to determine from respective such sensor messages the destination indications comprised therein, the authentication server further comprising one or more processors configured to compare the destination indications determined from respective such sensor messages which do not satisfy said predetermined authentication criteria with a predetermined list of destination indications, to forward such sensor messages which do not satisfy said predetermined authentication criteria to network locations indicated by the respective destination indications comprised in such sensor messages if the destination indications are included in the predetermined list of destination indications, and not to forward such sensor messages which do not satisfy said predetermined authentication criteria to the network locations indicated by the respective destination indications comprised in said sensor messages if the destination indications are not included in the predetermined list of destination indications.

According to preferred embodiments of the second aspect, the system comprises a plurality of wireless access points each configured to receive sensor messages from one or more sensor devices in a local wireless network via a local network interface and to forward said sensor messages via an external network interface to said predetermined authentication server.

The various options and preferred embodiments referred to above in relation to the first aspect are also applicable in relation to the second aspect.

Preferred embodiments of the invention relate to methods of enabling IoT connectivity via a (home or public) WiFi Access Point without needing WiFi usernames and passwords to be stored in IoT devices or managed by users. Sensor devices (which may have additional functions as well as sensing conditions and sending sensor messages—they may also function as actuators, for example) can connect to relevant internet-based servers (or other network-based servers, both private and public) to upload (and optionally download) information without users having to manage the security and authentication of the devices. While such sensor devices are able to communicate with their associated servers, their access is restricted to only those server—they are not granted general internet access. Such a WiFi "pinhole" to an IoT platform enables sensors (which may also function as actuators) to send data to the IoT platform (i.e. sensor data); and optionally to receive data or instructions from the IoT platform (i.e. actuator instructions, firmware, configuration files, signage info etc.); or (iii) Send and receive to/from the IoT platform. This can be used for machine-to-machine (M2M) communication.

Preferred embodiments can thus enable a new or existing network of WiFi Access Points to be used or re-used as a national or wide-ranging IoT network, allowing connection to an IoT Platform (run by an ISP or otherwise) to be simplified and/or made more cost-effective.

BRIEF DESCRIPTION OF THE DRAWINGS

A preferred embodiment of the present invention will now be described with reference to the appended drawings, in which:

FIG. 1 illustrates a scenario involving a local network from within which various devices may attempt to communicate with devices outside the local network, and shows symbolically various possible routes via which such communication may take place;

FIG. 2 is a message-flow diagram in respect of various procedures in which a wireless-capable sensor may be involved;

FIG. 3 is a flowchart illustrating the respective processes by which different types of wireless-capable devices (i.e. wireless-capable sensors and other devices) within a local network may attempt to communicate with devices outside the local network; and FIG. 4 shows a WiFi authentication server suitable for use in relation to a method according to a preferred embodiment.

DESCRIPTION OF PREFERRED EMBODIMENTS OF THE INVENTION

With reference to the accompanying figures, a method according to a preferred embodiment and associated systems and apparatus will be described.

FIG. 1 illustrates a scenario involving a local (area) network or LAN 10 within which various devices in a local area or building such as a home may be or are being used to communicate with servers and/or other devices (which are generally outside the local area or building) via external networks such as an access network of an Internet Services Provider 12, the Internet 15 or other networks, and/or with other platforms, networks etc.

In FIG. 1, for the purposes of describing a preferred embodiment, five different types of device are shown in the premises covered by the LAN 10, namely a wireless-enabled sensor device 1 (such as an Internet of Things (IoT) sensor), a handheld or "tablet-style" wireless-enabled computing device or smart-phone 2, a wireless-enabled laptop computer 3, a desktop computer 4 and an Internet-enabled television 5. The desktop computer 4 and television 5 may be wireless-capable, but for the purpose of the present example will be regarded as having Ethernet connections in order to illustrate relevant concepts as clearly as possible.

Also within the premises covered by the LAN 10 is an Internet gateway device 6. This has various inward-facing and outward-facing interfaces via which the devices within the LAN 10 may communicate with devices outside the LAN 10 in different ways. It has at least one inward-facing WiFi interface (which is shown in FIG. 1 as two functionally different WiFi interfaces (namely a "Public WiFi" interface 6a and a "Private WiFi" interface 6b) although it will be appreciated that gateway devices in some embodiments may not have a separate "Private WiFi" interface), and in the example of FIG. 1, also has an inward-facing Ethernet interface 6c (although it will be appreciated that gateway devices in some embodiments may not have an Ethernet interface). The gateway device 6 also has at least one outward-facing interface (in the example of FIG. 1, this would be at least the outward-facing side of the Public WiFi interface 6a) via which it is in communication with ISP Network 12, in order that it can forward data received via the Public WiFi interface 6a from devices within the LAN 10 and on towards intended destination nodes (devices, servers, etc.) outside the LAN 10 via external networks such as the ISP Network 12, the Internet 15 or other networks, and/or receive data destined for devices within the LAN 10 from outside the LAN 10 and pass them on to the appropriate devices within the LAN 10.

For the purposes of methods according to some embodiments, it will be appreciated that these may be applicable in relation to scenarios in which the gateway device 6 has an interface corresponding to Public WiFi interface 6a but no interface corresponding to Private WiFi interface 6b, and communicates wirelessly with devices such as the sensor device 1 and possibly with user devices such as wireless-enabled smart-phones or tablet devices 2, computing devices 3 or other user devices only via its Public WiFi interface. Such a gateway device may be a public WiFi Hotspot, rather than a home gateway device, for example.

As will become apparent, while the Public WiFi interface 6a and the Private WiFi interface 6b are shown as separate elements in FIG. 1, this is primarily in order to assist in the following explanation—they may well share some or all of the same hardware modules and processing capabilities within the gateway device 6, but may function as separate interfaces for different types of traffic and/or for data travelling to or from different devices. For similar reasons, the ISP Network 12 is shown symbolically as two separate partial networks or "clouds" 12a and 12b, but this is primarily to illustrate the different routes via which data may pass in different instances. While networks 12a and 12b would in fact generally be a single network 12 under the control of a single entity (generally the ISP concerned) and/or be sufficiently linked to each other to function as a single network 12 for most purposes, they have been shown as separate "clouds" 12a and 12b primarily in order to illustrate different paths and/or different processes via which different types of data or data from different devices may be forwarded. For this reason, gateway device 6 is shown in FIG. 1 as having functionally-separate outward-facing interfaces, one serving for communication between interfaces such as the Public WiFi interface 6a and a route through ISP Network 12a, and one serving for communication between the interfaces such as the Private WiFi interface 6b and a route through ISP Network 12b.

Looking first at the desktop computer 4 and television 5, these are shown as being connected to the gateway device 6 via the Ethernet interface 6c which is shown (functionally) as being part of an isolated private network 7b. Also within the isolated private network 7 is the Private WiFi interface 6b, via which the laptop computer 3 is shown as being connected to the gateway device 6.

Looking now at the sensor device 1 and the tablet device 2, these are shown as being connected to the gateway device 6 via the Public WiFi interface 6a, which is shown (functionally) as being part of a public network 7a, or at least outside the private network 7b.

With reference to the above, the gateway device 6 has the functionality to create one or more functionally-separate radio networks 7a, 7b. WiFi networks commonly identify such functionally-separate networks with a "Service Set Identifier" or SSID. A "service set" is the set of devices associated with a particular one of the functionally-separate radio networks, and can be local, independent, extended or mesh. Each service set has an associated SSID, which is generally a 32-byte identifier, which identifies the particular network, and which may or may not be broadcast. The SSID is configured within devices that are considered part of the functional radio networks, and can then be transmitted in the packets they send. Receivers generally ignore wireless packets from networks with a different SSID.

In the example of FIG. 1, two SSIDs are created, one for devices deemed within the private WiFi network 7b and one for devices not deemed within the private WiFi network 7b. Whilst these two radio networks may originate from a single radio chip and antenna, the network traffic transmitted via the Private WiFi interface 6b may thus be separated and isolated from the network traffic transmitted via the Public WiFi interface 6a, allowing the two types of network traffic, or network traffic from different devices or "sets" of devices, to be treated differently by the gateway device 6 and/or by subsequent devices.

In the context of a device such as gateway device 6, the traffic being transmitted out of the LAN 10 via the public network 7a and that being transmitted out of the LAN 10 via the private network 7b may be split logically, physically or otherwise within the gateway device 6, being forwarded on an appropriate path (12a or 12b) through the ISP network 12 via different ports, interfaces, routers, IP (or other) tunnels, etc. Alternatively, the respective types of traffic may be split logically, physically or otherwise after leaving the gateway device 6, in the ISP network 12 or otherwise.

As shown in FIG. 1, private WiFi traffic (i.e. that received from the laptop device 3 via Private WiFi interface 6b, for example) is transmitted onward on a route through ISP network 12b to reach the Internet 15 without further need for authentication (as indicated by the unbroken arrows between laptop device 3, Private WiFi interface 6b, ISP network 12b and Internet 15), and may then generally be forwarded on to any desired destination node (as specified by an IP address in the "destination" field of the IP header of each packet, for example).

The public WiFi traffic (i.e. that received from the sensor device 1 or the tablet device 2 via Public WiFi interface 6a) is instead transmitted onward through ISP network 12a which includes a WiFi authentication server 13, an example of which is shown in FIG. 4.

The functional modules of a WiFi authentication server 13, which would generally be located within an ISP network 12 and perform its functions on behalf of or under the control of an ISP, will be explained with reference to FIG. 4. The WiFi authentication server 13 has a client-side or client-facing interface 131 which is in communication with devices such as gateway device 6 within networks such as clients' local networks 10. Data may be received from and sent to local networks via client broadband lines connected to this interface. Data received from a client's local network 10 may be passed to a routing module 132. This may check whether the data has been received from an authorised client device by passing the data (or information from a header portion of the data, for example) to an authentication module 133, which has a list of authenticated clients or client devices stored in a memory 134. Under normal operation, if it is found that the data received is from an authorised client device, the routing module 132 passes the data to an Internet-side interface 139, from which it may be forwarded via the Internet 15 or otherwise to any desired destination node (as specified by an IP address in the "destination" field of the IP header of each packet, for example). If it is found that the data received is not from an authorised client device, the WiFi authentication server 13 may return a message to the client device requesting authentication credentials, or not forward the data to its desired destination.

In relation to the functionality of the WiFi authentication server 13 set out in the previous paragraph, this may be performed essentially in a standard manner.

In addition to the above functionality, the WiFi authentication server 13 also has a rules module 135 with access to a stored Destination Address Whitelist 136. This may allow the routing module to implement various rules, but in particular, it implements a rule such that even if it is found that data received is not from an authorised client device, a check is made as to whether the destination address specified for the data appears on the whitelist 136. If the destination address of data appears on the whitelist 136, the routing module passes the data to the Internet-side interface 139, from which it may be forwarded via the Internet 15 or otherwise towards the specified destination. In relation to the present example, this may be the Internet of Things Platform 18 (or one of a number of predetermined Internet of Things Platforms), or other pre-specified platforms or servers, for example.

Returning now to FIG. 1, as will be explained, data from the tablet device 2, not having the SSID required to pass via the Private WiFi interface 6b, passes via the Public WiFi interface 6a and onward on a route indicated by the unbroken arrows through ISP network 12a via the authentication server 13, at which point it is only forwarded on to the Internet and/or to its intended destination (as indicated by its destination address) if it includes an indication that it or the device from which it was sent had appropriate credentials to satisfy the authentication server 13. If so, it thus may proceed to a specified destination in or via the Internet 15 on the route indicated by the unbroken arrows through ISP network 12a.

Sensor data from sensor device 1, also transmitted through the Public WiFi interface 6a of the gateway 6 and onward on a route through ISP network 12a, is therefore also inspected by the authentication server 13 but despite this data not having appropriate "credentials" based on its SSID or otherwise, the authentication server 13 is able to see that this data has—as its destination address—an IP address of the IoT platform 18, which IP address appears on a whitelist of destination addresses available to the authentication server 13, and on account of this, the authentication server 13 therefore allows the data to reach the IoT platform 18, on a route indicated by the broken arrows in FIG. 1. (It should be noted that while the broken arrow between the ISP network 12a and the IoT platform 18 is not shown as passing through the cloud symbolising the Internet 15, the path between the ISP network 12a and the IoT platform 18 would generally be via the Internet—it is shown as a separate path in order to symbolise the difference in the logical paths taken by data from the IoT sensor 1 in the LAN 10 and data from other devices in the LAN 10 in the described embodiment.)

According to preferred embodiments, sensor 1 is one of a number of WiFi-enabled sensors that are pre-configured (possibly during manufacture) to connect to one of a number of gateway devices via the Public WiFi interface 6a of that gateway device. The pre-configuring may be by way of an open SSID set by the ISP, or some other indication that does not need the end-user to be involved in the configuration process, or even be aware of it.

Regardless of how this pre-configuring is done, once such a pre-configured sensor device is present and functional within a wireless LAN area and has established a connection with an applicable wireless-enabled gateway device such as gateway device 6, the gateway device will provide an IP address to the sensor 1 which, under normal conditions, would then allow the sensor to communicate via the Public WiFi interface 6a of the gateway device 6 with the ISP network 12a. However in the absence of appropriate credentials to satisfy the WiFi authentication server 13 in the ISP network 12a, the sensor would be prevented from communicating freely via the Internet 15 as a whole.

While the present example relates primarily to a scenario in which just one sensor 1 is present in the wireless LAN 10, it will be appreciated that there may be a number of such sensors all providing wireless sensor signals to the same gateway device 6. In such cases, the sensors may communicate directly with the gateway device 6, but it is possible for these to communicate with the gateway device 6 indirectly, via an aggregator device (not shown), which may receive sensor messages sent wirelessly from several sensors and forward them on to the gateway device 6.

A possible process by which such a sensor may communicate (via the Internet 15 or otherwise) with a specific destination such as an Internet of Things Platform 18, a server 18a or database 18b within it, or another specific entity will now be explained with reference to FIG. 2, which is a message-flow diagram in respect of difference procedures in which a sensor may be involved.

In the example of FIG. 2, once such a sensor is present within a local network such as LAN 10, and is functional (i.e. capable of transmitting and receiving signals), it establishes communication with the gateway device 6, using the SSID with which it has been configured, it is then assigned an IP address by the gateway device 6, as illustrated by the top section of FIG. 2.

If the sensor 1 attempts to obtain access to the Internet 15 in general, such an attempt will result in the request being blocked, as illustrated by the middle section of FIG. 2. The request may be passed through the gateway device 6 via its interface to the ISP Network 12, but the ISP's Authentication Server 13 will reject the request due to the request not coming from a device or from an account with appropriate credentials for access to the Internet in general, and the request not having a destination IP address on a whitelist held by or accessible to the authentication server 13.

If, on the other hand, the sensor 1 attempts to obtain access to the Internet of Things Platform 18, whose IP address is on the address whitelist, such an attempt will result in the success, as illustrated by the bottom section of FIG. 2. The request is passed through the gateway device 6 via its interface to the ISP Network 12, then, despite the request not coming from a device or from an account with appropriate credentials for access to the Internet in general, the request is accepted by the authentication server 13 for passing on to the IoT platform 18 due to it having a destination IP address on the whitelist. Essentially, due to the destination address itself being on the whitelist, the request is exempted from the usual requirements to perform an authentication procedure with the ISP's WiFi authentication server 13, so is granted despite the lack of WiFi access credentials.

FIG. 3 is a flowchart illustrating the primary differences between (a) attempts by an unauthenticated sensor such as the IoT sensor 1 within a local network such as LAN 10 of FIG. 1 to access a server or other computer at a specific whitelisted IP address (that of an IoT platform 18 or a device therein, for example) via a Public WiFi interface 6a of a wireless-capable gateway device such as gateway device 6, and (b) attempts by an unauthenticated, public or guest device such as the tablet device 2 within the local network 10 to access the Internet in general via the Public WiFi interface 6a of gateway device 6.

It should be noted that FIG. 3 does not reflect the situation regarding devices such as the laptop device 3, the desktop computer 4 and the Internet-enabled television 5 of FIG. 1 attempting to obtain access to the Internet, because for the purpose of this example, it is assumed that these devices are within the private WiFi network 7b, and therefore may communicate with servers or other computers at any IP address via a route through ISP network 12b, which allows them to access the Internet 15 without further need for authentication.

Starting at step s30, either type of device (i.e. the IoT sensor 1 and the tablet device 2) communicates with the gateway device 6, connecting with it (step s31) using the "open" SSID (i.e. that created for devices deemed to be within the public WiFi network 7a). The gateway device 6 may be configured to provide an alert to a user that a (new, unauthenticated) device is attempting to obtain access to the internet, in order that the user may maintain control over whether such devices may use the public WiFi interface 6a of the gateway device 6—such a step is not shown, as it is optional in the context of the present embodiment.

Assuming the device in question successfully connects to the gateway device 6 using the "open" SSID, the process proceeds to the respective version of step s32.

The ensuing process if the device is an unauthenticated sensor such as the IoT sensor 1 will first be described with reference to the right-hand side of FIG. 3.

If the device is IoT sensor 1, the attempt to access a node outside the LAN 10 will generally be a request (step s32a) either to post data to or to pull data from a server at a specific IP address, such as IoT Data Hub database 18b. Such a request is transmitted through the Public WiFi interface 6a of gateway device 6 and onward on a route through ISP network 12a, so is then inspected by the ISP's WiFi authentication server 13, which determines (step s33a) whether the destination address (i.e. the given destination address in each packet header or an identified URL in the request) is an address on a whitelist held by or otherwise accessible to the ISP's WiFi authentication server 13. If the address is not on the whitelist, the process proceeds to step s34, with the request being refused or redirected to the ISP's Wi-Fi Login/Register page. As an IoT sensor will in general be unable to respond to any such request for credentials that would allow authorisation, the process ends at step s40 without the request succeeding.

If however the address is on the whitelist, the process proceeds to step s35a, at which the request for access is granted and forwarded to the IoT Data Hub database 18b and/or other entities in the IoT Platform 18. This will happen purely on the basis of the stated destination address, irrespective of whether or not the request has appropriate "credentials" based on its SSID or otherwise. On reaching the IoT Platform 18, this may perform its own authentication process, possibly at an IoT Data Hub Authentication/Authorisation Server 18a, or the process may proceed directly to step s38a, at which point the request may result in data being stored and/or provided back to the sensor (step s38a) and the process ending (step s40).

If the IoT Platform 18 is to perform its own authentication process, the IoT Data Hub Authentication/Authorisation Server 18a may check authorisation information used in the applicable API (step s36a), which may be the "RESTful" API, for example. Information about this is available at http://searchcloudstorage.techtarget.com/definition/RESTful-API, for example. A RESTful API call to the named IoT Platform 18 may be protected by encrypted basic authentication over HTTPS, and this authorisation factor may be checked in the IoT Data Hub's Authentication/Authorisation Server 18a. If the request is authorised, a read/write operation from/to the Data Hub's database 18b may be performed, with a corresponding response being sent back to the sensor. If sensor whitelisting is enabled, this can be done in the IoT Data Hub's Authentication/Authorisation Server 18a, using the sensor's MAC address, for example. Moreover, unauthorised IP addresses or Denial of Service (DoS) attacks can be prevented in the corresponding firewall(s).

This may lead to the request itself being rejected after reaching the IoT Data Hub (step s37a), for example, and a response being sent back (step s39a) indicating such a rejection, thereby ending the process (step s40).

The process following connection as step s32 where the device is an unauthenticated, public or guest device such as the tablet device 2 will now be described with reference to the left-hand side of FIG. 3.

If the device is a device such as the tablet device 2, the attempt to access a node outside the LAN 10 may be a request (step s32a) to access a server, computer or other such node at any IP address, via the Internet. As with a request from an IoT sensor, such a request is transmitted through the Public WiFi interface 6a of gateway device 6 and onward on a route through ISP network 12a, so is then inspected by the ISP's WiFi authentication server 13. Unless the IP address of the request happens to be that of the IoT Platform 18 or another address on the whitelist (at which point the process would proceed according to the right-hand side of FIG. 3), the ISP's WiFi authentication server 13 determines (step s33b) whether the device (or its user) is logged in to the ISP's WiFi, or otherwise checks whether the request has appropriate credentials for the ISP's WiFi service. If not, the process proceeds to step s34, with the request being refused or redirected to the ISP's Wi-Fi Login/Register page. If the user is able to provide appropriate credentials, the process may proceed with access to the internet being granted after all (step s35b), otherwise the process ends at step s40 without the request succeeding.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The invention claimed is:

1. A method of enabling sensor data to be collected from sensor devices, the sensor devices being configured to sense a condition and to send sensor messages according to a wireless communication protocol to a wireless access point of a local network, the sensor messages comprising sensor data indicative of said condition, said sensor messages also comprising a destination indication indicative of a predetermined network location outside the local network, the method comprising:
   at a wireless access point configured to forward messages via an external network to a predetermined authentication server, the predetermined authentication server being configured to identify messages which satisfy predetermined authentication criteria:
      receiving sensor messages from one or more sensor devices; and
      forwarding said sensor messages via said external network to said predetermined authentication server;
   and at said authentication server:
      inspecting messages received from said wireless access point to determine whether respective messages satisfy said predetermined authentication criteria, and forwarding messages which do satisfy said predetermined authentication criteria on towards the respective network locations indicated by the destination indications comprised in said messages;
   wherein the method further comprises, at said authentication server:
      inspecting sensor messages received from said wireless access point which do not satisfy said predetermined authentication criteria and determining from respective such sensor messages the destination indications comprised therein;
      comparing the destination indications determined from respective sensor messages which do not satisfy said predetermined authentication criteria with a predetermined list of destination indications;
      in respect of sensor messages which do not satisfy said predetermined authentication criteria and which comprise destination indications included in the predetermined list of destination indications, forwarding said sensor messages to the respective network locations indicated by the destination indications comprised in said sensor messages; and
      in respect of sensor messages which do not satisfy said predetermined authentication criteria and which comprise destination indications not included in the predetermined list of destination indications, not forwarding said sensor messages to the respective network locations indicated by the destination indications comprised in said sensor messages; and
   wherein the wireless access point is configured to make respective identifiers available to devices in the local network indicative of the devices being deemed to be within a private wireless network or within a public wireless network, and whether an authentication is required is determined depending on the respective identifiers representing whether the device is within a private wireless network or within a public wireless network.

2. A method according to claim 1, the wireless access point being configured to inspect data received according to a wireless communication protocol from a device in the local network and identify from said data a wireless network identifier indicative of whether the device from which the data has been received is deemed to be within a private wireless network or within a public wireless network.

3. A method according to claim 2, the wireless access point being configured to route data having a wireless network identifier indicative that the device from which the data has been received is deemed to be within a public wireless network to said predetermined authentication server.

4. A method according to claim 2, the wireless access point being configured to route data having a wireless network identifier indicative that the device from which the data has been received is deemed to be within a private wireless network towards a destination indicated by a destination indication comprised in said data.

5. A method according to claim 1, the wireless access point also being configured to receive data via a wired connection and to route said data towards a destination indicated by a destination indication comprised in said data.

6. A method according to claim 1 wherein each of a plurality of wireless access points is configured to forward messages via an external network to a predetermined authentication server, each wireless access point being configured to receive sensor messages from one or more sensor devices, and to forward said sensor messages via said external network to said predetermined authentication server.

7. A method according to claim 1 wherein the authentication server is configured to inspect authentication credentials in respect of data received from said wireless access points and determine therefrom whether the data has been received from an authenticated device and/or from an authenticated user, and if so, to forward said data towards a network location indicated by a destination indications comprised in said data.

8. A method according to claim 1 wherein the authentication server is configured to inspect authentication credentials in respect of data received from said wireless access points and determine therefrom whether the data has been received from an authenticated device and/or from an authenticated user, and if not, to request authentication credentials in respect of the device and/or the user from which the data has been received.

9. A method according to claim 1 wherein the wireless access point is configured to receive sensor messages sent according to a wireless communication protocol from a plurality of sensor devices.

10. A method according to claim 1 wherein the wireless access point is configured to receive sensor messages from an aggregator device, the aggregator device being configured to receive sensor messages sent according to a wireless communication protocol from one or more sensor devices and forward said sensor messages to the wireless access point.

11. A method according to claim 1, wherein the sensor messages said sensor devices are configured to send are sensor messages indicative of one or more of the following: temperature, humidity, pressure, sound, light, movement or other activity, presence/absence, or other physical conditions.

12. A method according to claim 1, wherein the sensor devices are internet of things sensors, and the predetermined network location outside the local network is an internet of things platform.

13. A system for enabling sensor data to be collected from sensor devices, the sensor devices being configured to sense a condition and to send sensor messages according to a wireless communication protocol to a wireless access point of a local network, the sensor messages comprising sensor data indicative of said condition, said sensor messages also comprising a destination indication indicative of a predetermined network location outside the local network, the system comprising:
- one or more wireless access points each configured to receive sensor messages from one or more sensor devices in a local wireless network via a local network interface, and to forward said sensor messages via an external network interface to a predetermined authentication server in an external network, the predetermined authentication server being configured to identify messages which satisfy predetermined authentication criteria; and
- an authentication server configured to inspect messages received from one or more wireless access points for which it is the predetermined authentication server and to determine whether respective messages satisfy said predetermined authentication criteria, and to forward messages which do satisfy said predetermined authentication criteria on towards the respective network locations indicated by the destination indications comprised in said messages;
- wherein the authentication server is further configured to inspect sensor messages received from one or more wireless access points for which it is the predetermined authentication server and which do not satisfy said predetermined authentication criteria and to determine from respective such sensor messages the destination indications comprised therein, the authentication server further comprising one or more processors configured to compare the destination indications determined from respective such sensor messages which do not satisfy said predetermined authentication criteria with a predetermined list of destination indications, to forward such sensor messages which do not satisfy said predetermined authentication criteria to network locations indicated by the respective destination indications comprised in such sensor messages if the destination indications are included in the predetermined list of destination indications, and not to forward such sensor messages which do not satisfy said predetermined authentication criteria to the network locations indicated by the respective destination indications comprised in said sensor messages if the destination indications are not included in the predetermined list of destination indications
- wherein the one or more wireless access points is configured to make respective identifiers available to devices in the local network indicative of the devices being deemed to be within a private wireless network or within a public wireless network, and whether an authentication is required is determined depending on the respective identifiers representing whether the device is within a private wireless network or within a public wireless network.

14. A system according to claim 13, the system comprising a plurality of wireless access points each configured to receive sensor messages from one or more sensor devices in a local wireless network via a local network interface and to forward said sensor messages via an external network interface to said predetermined authentication server.

15. A system according to claim 13, wherein the sensor devices are internet of things sensors, and the predetermined network location outside the local network is an internet of things platform.

* * * * *